July 1, 1958  E. D. IANNETTI  2,840,902
TUBE CUTTER
Filed Nov. 8, 1957  2 Sheets-Sheet 1
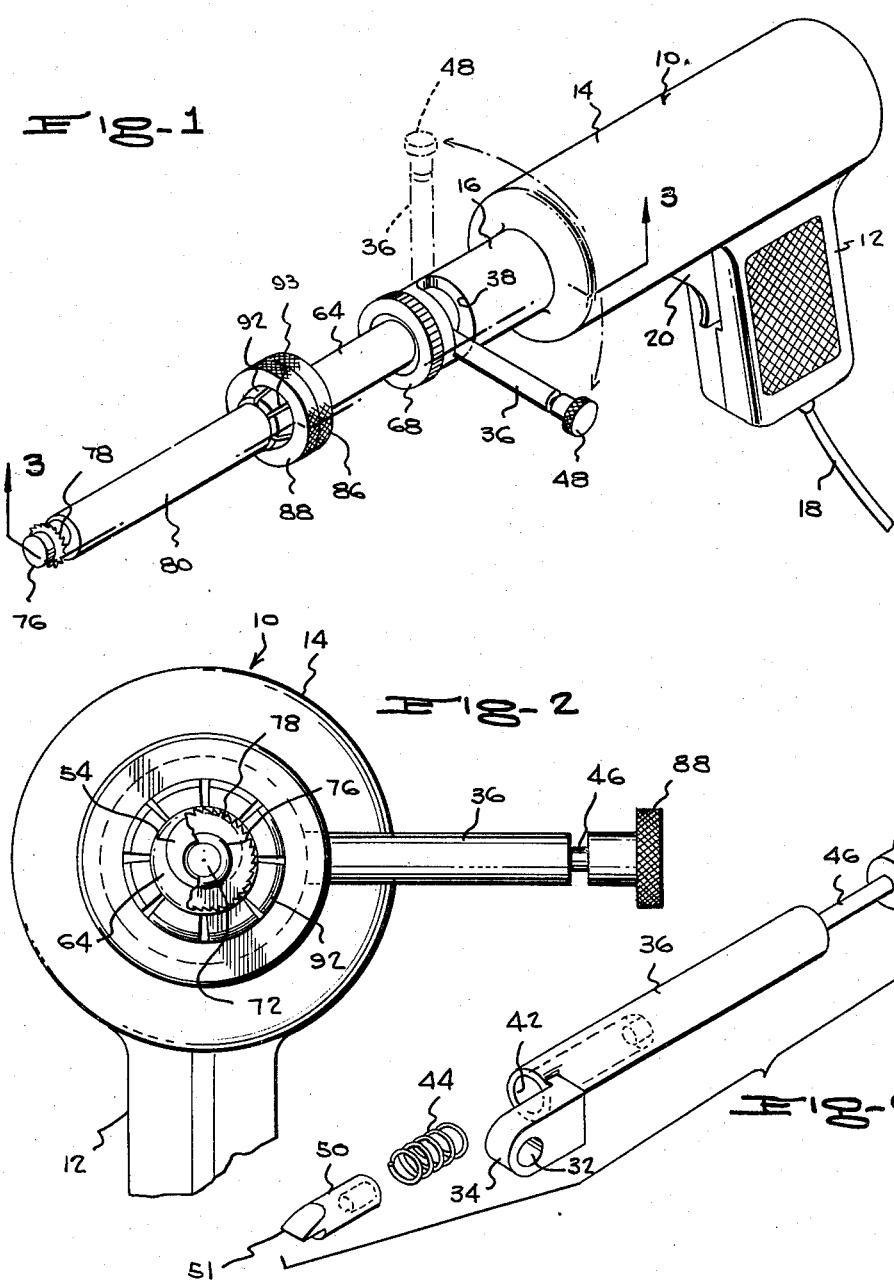
INVENTOR.
ERNEST D. IANNETTI
BY
McMorrow, Berman & Davidson
ATTORNEYS

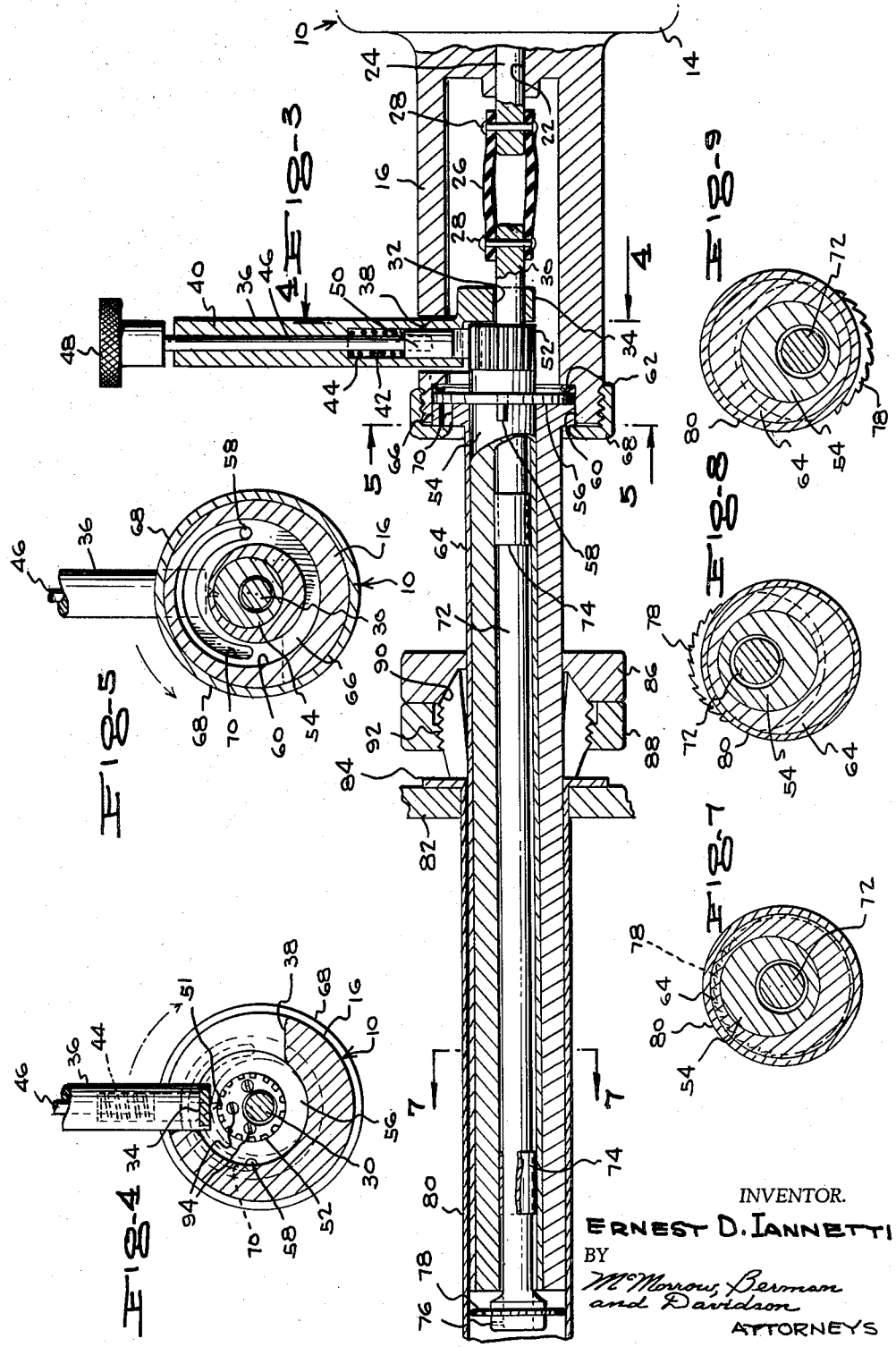

United States Patent Office 2,840,902
Patented July 1, 1958

2,840,902

TUBE CUTTER

Ernest D. Iannetti, Warrensville Heights, Ohio

Application November 8, 1957, Serial No. 695,331

8 Claims. (Cl. 30—104)

This invention relates generally to devices for cutting through tubes and pipes.

It is often necessary to cut portions off tubes, while the tubes remain in place in a structure of which they are component parts. For example, this would be true of boiler tubes, header tubes, condenser tubes, and similar installations in which it is often the case that there is a very large number of tubes, in closely spaced relation, making access to any particular tube very difficult.

It is the general practice to cut the tubes with an acetylene torch. However, this practice is very slow and costly, particularly in view of the fact that many more tubes have to be removed than it is actually desired to cut off. This will be understood when it is considered that a torch must be applied from a location outside the tube being cut. To properly position the torch for the cutting operation, it may be necessary to first cut away a substantial number of tubes immediately adjacent that which has to be cut. Not only is it necessary to provide sufficient room for the cutting tool, but in addition, it is necessary to provide room for the workman himself.

In addition, the burning off of the tube, by use of a torch, is dangerous and causes a hard burr to form upon the burnt-off end, which is highly objectionable.

In view of the difficulties which have heretofore persisted, the main object of the present invention is to provide a tool which will be properly termed an inside or internally applied cutter, that is, the tool is inserted directly into the tube that is to be cut off, and cuts the tube from the inside out, rather than from the outside in as has previously been the case. In this way, all need of cutting away adjacent tubes is completely eliminated, due to the fact that no room either for the cutting tool or workman is required where adjacent tubes are disposed, this being true by reason of the fact that the tool is inserted through the end of the tube rather than from the side.

A more specific object is to provide a tool of the character described which will be relatively light and easy to handle, and which will be designed for power operation using a conventional air motor, electric motor, or equivalent prime mover.

Another object is to provide a tool of the character described that will be accurate and speedy in operation.

Another object is to so form the tool that it will be usable in cutting tubes differing from one another in respect to their internal or external diameters.

A further object of importance is to so form the tool that it can be swiftly adjusted to insure that the cutting of the tube will take place at a prescribed distance inwardly from the end of the tube, according to the needs of the particular situation.

A further object of importance is to provide a tool of the character described which can be swiftly disengaged from the tube and removed following the completion of the cutting operation.

Yet another object is to provide a tool as stated which, despite the decided benefits to be obtained from use of the invention, will nevertheless be designed for manufacture at a comparatively low cost, will comprise a comparatively few parts simply arranged in a manner whereby they will not get out of order, and will be designed for use by workmen not possessing a high degree of skill.

Other objects will appear from the following description, the claims appended thereto, and from the annexed drawing, in which like reference characters designate like parts throughout the several views, and wherein:

Figure 1 is a perspective view of a tool formed according to the present invention, with a ratchet operating handle being shown in opposite extreme positions to which it is movable, in full and dotted lines respectively;

Figure 2 is an enlarged end elevational view, portions being broken away, showing the tool as seen from the left of Figure 1;

Figure 3 is a longitudinal sectional view on substantially the same scale as Figure 2, taken substantially on line 3—3 of Figure 1;

Figure 4 is a transverse sectional view on the same scale as Figure 3, taken substantially on line 4—4 of Figure 3;

Figure 5 is a transverse sectional view, on the same scale as Figure 3, taken on line 5—5 of Figure 3;

Figure 6 is an exploded, enlarged perspective view of the ratchet means and the associated operation handle therefor; and Figures 7, 8, and 9 are transverse sectional views, enlarged above the scale of Figure 3, taken substantially on line 7—7 of Figure 3, showing the parts in successively following stages of the operation.

Referring to the drawings in detail, designated generally at 10 is a drive motor, including a pistol grip handle 12 integrally connected to or otherwise made rigid with an elongated, large-diameter, cylindrically shaped motor housing 14. A conventional motor, which can be any of various types, is provided within the housing 14 and it is not thought necessary, accordingly, to show the details of operation and of construction of the motor. The motor might, for example, be an air motor, or alternatively a conventional electric motor, and of course, the rating, size, etc., are all within the skill of those working in the art and need not be dwelled upon herein.

It is sufficient to note that fixedly connected to and projecting forwardly from housing 14 in coaxial alignment therewith is a cylindrically shaped, axially bored casing 16. It may also be noted that in the illustrated example, power is supplied to the motor through an electric cord 18 (Figure 1) and the motor would be turned on and off by a conventional trigger mechanism 20 projecting forwardly from the pistol grip handle 12.

At the inner end of the casing 16 there is provided an axial bore 22, and journalled in said bore is the shaft 24, which would be driven by the motor. A flexible coupling 26 is secured at its opposite ends, by rivets 28 or equivalent means, to the shaft 24 and to the drive shaft 30 of the device. The flexible coupling permits the drive shaft 30 to move out of coaxial alignment with the motor shaft 24, since the shaft 30 will travel eccentrically in respect to the shaft 24, while still being drivingly coupled with said shaft 24.

Shaft 30, immediately forwardly of the flexible coupling 26, extends through an opening 32 (Figures 3 and 6) formed in a laterally offset, longitudinally extending ear 34 integrally formed upon the inner end of an elongated, straight ratchet operating handle 36, that projects through a circumferentially extending slot 38 (Figures 1 and 3) formed in the forward portion of casing 16 and extending through 90 degrees of the casing circumference.

In the inner end portion of the handle 36 there is formed an axially extending counterbore 42 in which is disposed a compression coil spring 44 circumposed about a plunger or stem 46 that is rotatable and axially shiftable within the bore 40.

Stem 46 at its outer end projects beyond the outer end of the handle 36 and is provided with a knurled knob 48. At its inner end, the stem is secured to a pawl 50 having a single tooth 51 engageable with a ratchet wheel 52. Spring 44 is interposed between the pawl 50 and the inner end of the bore 42, thus continuously, yieldably biasing the pawl in a direction radially inwardly of the casing 16, into engagement with the ratchet wheel 52.

The ratchet wheel 52 has an eccentric opening, through which extend the shaft 30, said wheel being connected to the shaft 30 for rotation thereon.

The shaft 30, immediately forwardly of the ratchet wheel 52, extends into an elongated, straight inner bearing tube 54 having an eccentrically disposed, axial, end-to-end bore. The inner bearing tube 54 is rigid, adjacent its inner extremity, with a flat, large-diameter collar 56 and projecting forwardly from said collar is a lug 58.

Formed in the forward end portion of the casing 16 is a counterbore 60 and in the inner end of the counterbore there is provided a spacer washer 62 which bears against the collar 56.

An elongated outer bearing tube 64 is substantially coextensive in length with the inner bearing tube 54 and has a large-diameter, end-to-end, eccentrically disposed axial bore in which the inner bearing tube is rotatably engaged. The outer ends of the inner and outer bearing tubes are flush with one another as clearly shown in Figure 3. At its inner end, the outer bearing tube 64 is formed integrally with a collar 66, that bears against the collar 56.

A closure cap 68 has a threaded skirt engaging complementary threads formed upon the casing 16, and said cap bears against the collar or flange 66 of the outer bearing tube, to hold the outer bearing tube assembled with the casing.

A slot 70 extends through substantially 180 degrees of the marginal portion of the collar 66 (see Figure 5), with the lug 58 projecting through said slot.

Constituting a part of the drive shaft of the cutting blade is an elongated, straight extension 72 of the shaft 30. Extension 72 is extended through the eccentrically located bore of the inner bearing tube 54, and is rotatable in said bore, being spaced slightly from the wall of the bore through the provision of longitudinally spaced bushings 74 that extend about the drive shaft extension (see Figure 3).

The forward extremity of the cutter blade drive shaft extends beyond the inner and outer bearing tubes, and secured to the projecting end of the shaft 72 for rotation therewith is a sleeve 76, with which is integral or otherwise rigid a circular cutting blade 78 that is concentric with the axis of the shaft 72. A set screw may be employed to secure the sleeve 76 to the shaft 72, so that said sleeve can be removed for the purpose of replacing the blade in the event said blade becomes dull or is broken.

The tube being cut has been designated at 80 and constitutes the workpiece into which the tool extends and which is to be cut intermediate its ends in a prescribed location. The tubular workpiece 80, in the illustrated conventional installation, is fixedly mounted in an opening of a wall, such as the wall of a boiler or similar installation. The tube may have an outwardly directed flange 84 secured to the wall 82.

Positioning means for the tool includes a collet stop 86, which is knurled and which is formed to the same diameter as a jam nut 88. The collet stop has a counterbore 90 receiving one end of the collet 92, said collet having uniformly, angularly spaced longitudinal slits 93 defining therebetween tongues which are adapted to be contracted into gripping engagement with the outer bearing tube 64. In other words, the collet is contracted radially against the outer bearing tube. Thereafter the jam nut is threaded on the threads of the collet (see Figure 3) against the collet stop 86, thus to retain the collet in gripping engagement with the outer bearing tube.

Assuming that one knows the length of the workpiece 80 that is to be cut off, the collet stop is set at a corresponding distance longitudinally of the tool from the cutting blade 78. In other words, the distance between the cutting blade 78 and the forward extremity of the collet is the distance equal to the length of that part of the tubular workpiece 80 that is to be cut off.

The collet is now locked in position and the tool is extended into the work piece 80, until the collet stop bears against the outer end of the tubular workpiece. Then, the switch 20 is turned on. This causes high speed rotation of the cutter blade drive shaft 30, 72. At this particular moment, of course, there will be no cutting action since the cutter blade drive shaft 72 and the blade 28 are coaxial, as of this stage of the operation, with the tubular workpiece 80.

The knob 48 is now rotated to dispose the tooth 51 in a position to effect rotation of the ratchet 52 in a direction which is clockwise when the same is viewed as in Figure 4. This is the position of the tooth 51 shown in Figure 4.

In the next step, the radial arm 36 is turned through 90 degrees, in the direction of the arrows shown in Figure 4, travelling from one end of the 90 degree slot 38 to the other end. This rotates the ratchet 52 ninety degrees from its Figure 4 position, in a direction which is clockwise in this figure of the drawing.

Before the ratchet started its turning movement, lug 58 was in the position shown in Figure 5. Therefore, when the arm 36 and ratchet 52 were turned through 90 degrees, the lug 58 moved through half the length of the elongated, 180-degree slot 70.

The ratchet is rigid with the inner bearing tube and in fact may be formed as an integral inner end portion of the bearing tube. Alternatively, as shown in Figure 4, it may be connected to the bearing tube by screws 94 (Figure 4).

The arm 36 is now swung back to its Figure 4 position, with tooth 51 ratcheting over the ratchet wheel 52 so that the arm 36 is moved to its starting position without causing reverse turning of the ratchet wheel. Once again, now, the arm 36 is swung clockwise in Figure 4 to the right hand end of slot 38.

This will bring the lug 58 to the other extreme position thereof, that is, the lug or pin 58 will move to the left hand end of slot 70, viewing the same as in Figure 5.

At this stage of the operation, the cutting blade 78 would have moved from its Figure 7 position to its Figure 8 position. In other words, at the beginning of the operation the cutting blade, ratchet wheel 54 and shaft 72 were all in the Figure 7 position. Turning of the ratchet wheel 54 through 180 degrees, from its Figure 7 position by means of the pawl, will cause the ratchet to move from its Figure 7 to its Figure 8 position. This of course means that shaft 72 will move from its perfectly centered position shown in Figure 7 to its eccentric position shown in Figure 8. This causes the periphery of blade 78 to be moved partially through the wall of the workpiece 80, cutting through the workpiece, inasmuch as the shaft 72 would of course have been rotating at high speed throughout the operation of the ratchet means.

With the wall 80 cut through in one location and the parts now in their Figure 8 position, further oscillation of the arm 36 between its opposite extreme positions will cause progressive rotational movement of the ratchet wheel and, with it, the outer bearing tube. In other words, now the ratchet wheel, inner bearing tube and outer bearing tube are operating as a unit. By reason of this step-by-step advancement of the named components, the blade 78 would be progressively moved about the circumference of the wall 80, starting with its Figure 8 position. The cutting blade 78 is shown halfway through the complete circumference of the bearing tube, in Figure 9. The wall of the tube 80 is thus cut progressively through the full circumference of the work piece.

When the wall of the workpiece has been cut completely through, one simply pulls the stem outwardly out of engagement with the ratchet wheel 52, and rotates the stem by means of the knob 48 through 180 degrees so as to reverse the position of the pawl tooth, so that the back and forth swinging movement of the arm 36 between its full and dotted line positions of Figure 1 will now cause reverse rotational movement of the ratchet wheel back to a position in which the cutter blade drive shaft, 30, 72 is again perfectly centered, that is, is retracted to its Figure 3 position in which it is concentric with the workpiece. The tool is now removed.

As will be appreciated, the construction is such that it is not necessary to approach the workpiece from the side, so that there is no interference with the operation from adjacent tubes that are in closely, laterally spaced relation to the workpiece. Rather, the tool is inserted in an endwise or axial direction in respect to the workpiece 80, and hence there is no interference from any other tubes, since the tubes in a boiler structure of the character illustrated and described are readily accessible from the ends thereof. Further, the tool is easily manipulated, is safe to use, and is swiftly movable into the tube to a predetermined, selected extent governed by the adjustable positioning of the stop means 92. Still further, the tool is under full control, as the projecting portion of the periphery of the cutting blade 78 travels about the circumference of the workpiece. The control is afforded by the arm 36, and obviously, if desired, the inner and outer bearing tubes when being turned as a single unit, can be rotatably advanced slowly or rapidly, whichever is desired.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A tube cutter comprising a drive means including a readily portable motor housing; a casing extending from and rigid with the housing; a shaft having a flexible coupling within the casing to said drive means for rotation thereby; a rotary blade secured to the shaft for rotation therewith, said shaft and blade being insertable in a tubular workpiece; an elongated inner bearing tube journalled in the casing and having a longitudinal eccentric bore in which the shaft is journalled; an elongated outer bearing tube also journalled in the casing and having an eccentric bore in which the inner bearing tube is rotatably mounted; and means mounted in the casing operable by a user for first rotating the inner bearing tube independently of the outer bearing tube in a direction to move the shaft and blade to a position eccentric to the workpiece, for passage of the blade through the wall of the workpiece, and then linking the inner and outer bearing tubes for conjoint rotation for effecting travel of the eccentrically disposed shaft and blade bodily in a circular path about the axis of the workpiece for cutting of the workpiece over the full circumference thereof.

2. A tube cutter comprising a drive means including a readily portable motor housing; a casing projecting forwardly from and rigid with the housing; an elongated shaft having a flexible coupling within the casing to said drive means for rotation thereby, said shaft projecting forwardly from the casing; a rotary cutting blade secured to the shaft for rotation therewith, said shaft and blade being insertable in a tubular workpiece; an elongated inner bearing tube journalled in the casing and having a longitudinal eccentric bore in which the shaft is journalled; an elongated outer bearing tube also journalled in the casing and having an eccentric bore in which the inner bearing tube is rotatably mounted; and means mounted in the casing operable by a user for first rotating the inner bearing tube independently of the outer bearing tube in a direction to move the shaft and blade to a position eccentric to the workpiece, for passage of the blade through the wall of the workpiece, and then linking the inner and outer bearing tubes for conjoint rotation for effecting travel of the eccentrically disposed shaft and blade bodily in a circular path about the axis of the workpiece for cutting of the workpiece over the full circumference thereof.

3. A tube cutter comprising a drive means including a readily portable motor housing; a casing projecting forwardly from and rigid with the housing; an elongated shaft having a flexible coupling within the casing to said drive means for rotation thereby, said shaft projecting forwardly from the casing; a rotary cutting blade secured to the shaft for rotation therewith, said shaft and blade being insertable in a tubular workpiece; an elongated inner bearing tube journalled in the casing and having a longitudinal eccentric bore in which the shaft is journalled; an elongated outer bearing tube also journalled in the casing and having an eccentric bore in which the inner bearing tube is rotatably mounted; and means mounted in the casing operable by a user for first rotating the inner bearing tube independently of the outer bearing tube in a direction to move the shaft and blade to a position eccentric to the workpiece, for passage of the blade through the wall of the workpiece, and then linking the inner and outer bearing tubes for conjoint rotation for effecting travel of the eccentrically disposed shaft and blade bodily in a circular path about the axis of the workpiece for cutting of the workpiece over the full circumference thereof, said inner and outer bearing tubes having flanges at one end thereof rotatably engaged in the casing to provide for the journalling of the respective bearing tubes in the casing.

4. A tube cutter comprising a drive means including a readily portable motor housing; a casing projecting forwardly from and rigid with the housing; an elongated shaft having a flexible coupling within the casing to said drive means for rotation thereby, said shaft projecting forwardly from the casing; a rotary cutting blade secured to the shaft for rotation therewith, said shaft and blade being insertable in a tubular workpiece; an elongated inner bearing tube journalled in the casing and having a longitudinal eccentric bore in which the shaft is journalled; an elongated outer bearing tube also journalled in the casing and having an eccentric bore in which the inner bearing tube is rotatably mounted; and means mounted in the casing operable by a user for first rotating the inner bearing tube independently of the outer bearing tube in a direction to move the shaft and blade to a position eccentric to the workpiece, for passage of the blade through the wall of the workpiece, and then linking the inner and outer bearing tubes for conjoint rotation for effecting travel of the eccentrically disposed shaft and blade bodily in a circular path about the axis of the workpiece for cutting of the workpiece over the full circumference thereof, said inner and outer bearing tubes having flanges at one end thereof rotatably engaged in the casing to provide for the journalling of the respective bearing tubes in the casing, the flanges being in face-to-face contact, the flange of the outer bearing tube having an arcuate slot extending through 180 degrees of its circumference, the inner bearing tube including a lug carried by the flange thereof and extending through the slot, whereby to effect said conjoint rotation of the bearing tubes responsive to relative rotation of the tubes through 180 degrees.

5. A tube cutter comprising a drive means including a readily portable motor housing; a casing projecting forwardly from and rigid with the housing; an elongated shaft having a flexible coupling within the casing to said drive means for rotation thereby, said shaft projecting forwardly from the casing; a rotary cutting blade secured to the shaft for rotation therewith, said shaft and blade being insertable in a tubular workpiece; an elongated inner bearing tube journalled in the casing and having a longitudinal eccentric bore in which the shaft is journalled; an elongated outer bearing tube also journalled in the casing and having an eccentric bore in which the inner bearing tube is rotatably mounted; and means mounted in the casing operable by a user for first rotating the inner bearing tube independently of the outer bearing tube in a direction to move the shaft and blade to a position eccentric to the workpiece, for passage of the blade through the wall of the workpiece, and then linking the inner and outer bearing tubes for conjoint rotation for effecting travel of the eccentrically disposed shaft and blade bodily in a circular path about the axis of the workpiece for cutting of the workpiece over the full circumference thereof, said inner and outer bearing tubes having flanges at one end thereof rotatably engaged in the casing to provide for the journalling of the respective bearing tubes in the casing, the flanges being in face-to-face contact, the flange of the outer bearing tube having an arcuate slot extending through 180 degrees of its circumference, the inner bearing tube including a lug carried by the flange thereof and extending through the slot, whereby to effect said conjoint rotation of the bearing tubes responsive to relative rotation of the tubes through 180 degrees, said last-named means comprising a ratchet wheel connected to the inner bearing tube for rotation therewith, and a pawl means mounted in the casing for operation by a user and adapted for rotating the ratchet wheel in a selected direction.

6. A tube cutter comprising a drive means including a readily portable motor housing; a casing projecting forwardly from and rigid with the housing; an elongated shaft having a flexible coupling within the casing to said drive means for rotation thereby, said shaft projecting forwardly from the casing; a rotary cutting blade secured to the shaft for rotation therewith, said shaft and blade being insertable in a tubular workpiece; an elongated inner bearing tube journalled in the casing and having a longitudinal eccentric bore in which the shaft is journalled; an elongated outer bearing tube also journalled in the casing and having an eccentric bore in which the inner bearing tube is rotatably mounted; and means mounted in the casing operable by a user for first rotating the inner bearing tube independently of the outer bearing tube in a direction to move the shaft and blade to a position eccentric to the workpiece, for passage of the blade through the wall of the workpiece, and then linking the inner and outer bearing tubes for conjoint rotation for effecting travel of the eccentrically disposed shaft and blade bodily in a circular path about the axis of the workpiece for cutting of the workpiece over the full circumference thereof, said inner and outer bearing tubes having flanges at one end thereof rotatably engaged in the casing to provide for the journalling of the respective bearing tubes in the casing, the flanges being in face-to-face contact, the flange of the outer bearing tube having an arcuate slot extending through 180 degrees of its circumference, the inner bearing tube including a lug carried by the flange thereof and extending through the slot, whereby to effect said conjoint rotation of the bearing tubes responsive to relative rotation of the tubes through 180 degrees, said last-named means comprising a ratchet wheel connected to the inner bearing tube for rotation therewith, and a pawl means mounted in the casing for operation by a user and adapted for rotating the ratchet wheel in a selected direction, said pawl means being reversible for effecting reversal of the ratcheting action of the ratchet wheel.

7. A tube cutter comprising a drive means including a readily portable motor housing; a casing projecting forwardly from and rigid with the housing; an elongated shaft having a flexible coupling within the casing to said drive means for rotation thereby, said shaft projecting forwardly from the casing; a rotary cutting blade secured to the shaft for rotation therewith, said shaft and blade being insertable in a tubular workpiece; an elongated inner bearing tube journalled in the casing and having a longitudinal eccentric bore in which the shaft is journalled; an elongated outer bearing tube also journalled in the casing and having an eccentric bore in which the inner bearing tube is rotatably mounted; and means mounted in the casing operable by a user for first rotating the inner bearing tube independently of the outer bearing tube in a direction to move the shaft and blade to a position eccentric to the workpiece, for passage of the blade through the wall of the workpiece, and then linking the inner and outer bearing tubes for conjoint rotation for effecting travel of the eccentrically disposed shaft and blade bodily in a circular path about the axis of the workpiece for cutting of the workpiece over the full circumference thereof, said inner and outer bearing tubes having flanges at one end thereof rotatably engaged in the casing to provide for the journalling of the respective bearing tubes in the casing, the flanges being in face-to-face contact, the flange of the outer bearing tube having an arcuate slot extending through 180 degrees of its circumference, the inner bearing tube including a lug carried by the flange thereof and extending through the slot, whereby to effect said conjoint rotation of the bearing tubes responsive to relative rotation of the tubes through 180 degrees, said last-named means comprising a ratchet wheel connected to the inner bearing tube for rotation therewith, and a pawl means mounted in the casing for operation by a user and adapted for rotating the ratchet wheel in a selected direction, said pawl means being reversible for effecting reversal of the ratcheting action of the ratchet wheel, the pawl means comprising an elongated arm rotatably mounted on and extending radially from the casing, and a pawl element carried by the arm.

8. A tube cutter comprising a drive means including a readily portable motor housing; a casing projecting forwardly from and rigid with the housing; an elongated shaft having a flexible coupling within the casing to said drive means for rotation thereby, said shaft projecting forwardly from the casing; a rotary cutting blade secured to the shaft for rotation therewith, said shaft and blade being insertable in a tubular workpiece; an elongated inner bearing tube journalled in the casing and having a longitudinal eccentric bore in which the shaft is journalled; an elongated outer bearing tube also journalled in the casing and having an eccentric bore in which the inner bearing tube is rotatably mounted; and means mounted in the casing operable by a user for first rotating the inner bearing tube independently of the outer bearing tube in a direction to move the shaft and blade to a position eccentric to the workpiece, for passage of the blade through the wall of the workpiece, and then linking the inner and outer bearing tubes for conjoint rotation for effecting travel of the eccentrically disposed shaft and blade bodily in a circular path about the axis of the workpiece for cutting of the workpiece over the full circumference thereof, said inner and outer bearing tubes having flanges at one end thereof rotatably engaged in the casing to provide for the journalling of the respective bearing tubes in the casing, the flanges being in face-to-face contact, the flange of the outer bearing tube having an arcuate slot extending through 180 degrees of its circumference, the inner bearing tube including a lug carried by the flange thereof and extending through the slot, whereby to effect said conjoint rotation of the bearing tubes responsive to relative rotation of the tubes through 180 degrees, said last-named means comprising a ratchet wheel connected to the inner bearing tube for rotation therewith, and a pawl means mounted in the casing for operation by a user and adapted for rotating the ratchet wheel in a selected direction, said pawl means being reversible for effecting reversal of the ratcheting action of the ratchet wheel, the pawl means comprising an elongated arm rotatably mounted on and extending radially from the casing, and a pawl element carried by the arm, said pawl element being spring biased in the direction of the ratchet, the arm being limited by the casing against rotational movement about the casing beyond an angular distance of 90 degrees of the casing circumference.

References Cited in the file of this patent
UNITED STATES PATENTS

| | | |
|---|---|---|
| 769,310 | Faessler | Sept. 6, 1904 |
| 802,215 | Johnson | Oct. 17, 1905 |
| 860,052 | McCormick | July 16, 1907 |
| 906,865 | Faessler | Dec. 15, 1908 |